(12) United States Patent
Lewis (10) Patent No.: US 8,468,741 B2
(45) Date of Patent: Jun. 25, 2013

(54) SEMI-AUTOMATED CROP PRODUCTION SYSTEM

(76) Inventor: Myles D. Lewis, Tucson, AZ (US)

( * ) Notice: Subject to any disclaimer, the term of this patent is extended or adjusted under 35 U.S.C. 154(b) by 116 days.

(21) Appl. No.: 13/070,407

(22) Filed: Mar. 23, 2011

(65) Prior Publication Data

US 2011/0232186 A1     Sep. 29, 2011

Related U.S. Application Data

(60) Provisional application No. 61/316,777, filed on Mar. 23, 2010.

(51) Int. Cl.
*A01G 9/02*     (2006.01)

(52) U.S. Cl.
USPC .......................... 47/66.6; 47/17; 47/58.1 LS (58) Field of Classification Search
CPC ...................................................... A01G 9/02
USPC ................ 47/58.1 LS, 66.1, 66.7, 39, 44, 46, 47/66.6, 65.5, 60, 18, 17, 61; 362/217.01, 362/217.14, 217.15, 218, 227, 230, 231, 362/234, 246, 800, 805, 249.02, 253; 250/515.1
See application file for complete search history.

(56) References Cited

U.S. PATENT DOCUMENTS

| | | | |
|---|---|---|---|
| 4,799,858 A | 1/1989 | Shin-Chin | |
| 4,914,858 A * | 4/1990 | Nijssen et al. | 47/1.01 R |
| 5,012,609 A * | 5/1991 | Ignatius et al. | 47/1.01 R |
| 5,101,593 A | 4/1992 | Bhatt | |
| 5,111,612 A * | 5/1992 | Takishima et al. | 47/60 |
| 5,299,383 A * | 4/1994 | Takakura et al. | 47/58.1 R |
| 5,833,293 A | 11/1998 | Ludwig | |
| 6,508,033 B2 | 1/2003 | Hessel et al. | |
| 6,554,450 B2 * | 4/2003 | Fang et al. | 362/231 |
| 7,160,717 B2 * | 1/2007 | Everett | 435/286.2 |
| 7,975,429 B2 * | 7/2011 | Okabe et al. | 47/61 |
| 8,234,812 B1 * | 8/2012 | Colless et al. | 47/61 |
| 2008/0216398 A1 | 9/2008 | Townsley | |
| 2008/0295400 A1 | 12/2008 | Harwood et al. | |
| 2010/0018131 A1 | 1/2010 | Green | |
| 2011/0041415 A1 | 2/2011 | Esposito | |
| 2012/0120658 A1 * | 5/2012 | Wilk | 362/249.02 |
| 2012/0170263 A1 * | 7/2012 | Rodriguez | 362/230 |

\* cited by examiner

*Primary Examiner* — Rob Swiatek
*Assistant Examiner* — Ebony Evans (57) ABSTRACT

A semi-automated crop production featuring a growing module with grids of cells for growing plants and a lighting and airflow fixture positioned above each cell. The lighting and airflow fixture features a fan disposed in a housing, a light emitting diode (LED) assembly board comprising LEDs disposed below the fan; a light diffuser disposed below the LED assembly board, and an adjustable air flow nozzle extending downwardly from the fan and protruding through the LED assembly board and the light diffuser. The adjustable air flow nozzle provides directed air flow downwardly toward a bottom area of the housing.

9 Claims, 7 Drawing Sheets

SEMI-AUTOMATED CROP PRODUCTION SYSTEM

CROSS REFERENCE

The present application is a non-provisional application claiming priority to U.S. Provisional Patent Application Ser. No. 61/316,777, filed Mar. 23, 2010, the disclosure of which is incorporated in its entirety herein by reference.

FIELD OF THE INVENTION

The present invention is directed to agriculture systems, more particularly to a self-contained semi automated production facility capable of culturing plants and other organisms in a controlled environment. The present invention is in no way limited to the examples disclosed herein.

BACKGROUND OF THE INVENTION

As population continues to grow, more land is required for habitation and more food is required for consumption. To accommodate growing urbanization and the decrease of arable land area, agricultural systems are centralizing to hotspots within the U.S. and other countries. However, these large-scale production systems may use inefficient methods, and some systems may select fruits and vegetables for their ability to be harvested early and transport for extended periods of time as opposed to being selected for good nutritional content. The increase use of transplants is needed to support the increase in farming for the rising population. Some consumers may wish to engage in supporting or growing locally produced foods for increased quality, nutrition and lower price. However, many cities lack the zoning laws to address small-scale agricultural operations. The present invention features a self-contained semi-automated production facility capable of culturing plants and other organisms in a controlled environment. The system of the present invention provides optimal environmental conditions, regardless of the external conditions, to allow for production of such plants and organisms. The system of the present invention helps to use better technologies to produce food, rather than the traditional methods. The present invention is in no way limited to the examples disclosed herein.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description.

DESCRIPTION OF PREFERRED EMBODIMENTS

The following is a listing of numbers corresponding to a particular element referred to herein. The present invention is not limited to the described examples components and configurations:

1. Growing plane(s)/flood tray(s) (pre-plumbed) (e.g., supporting aluminum structure)
2. Fitted tray cover for growing plane
3. Misting/aeroponic manifold(s)
4. Sensor Array(s) inside growing area/volume (e.g., wireless, air T, RH, VPD, $CO_2$, PAR, EC, pH, TDS, DO)
5. Orifice for seedling/media placement
6. Light Source(s) module(s) (T-8, T-12, T-5 Fluorescent; LED; HID; Incandescent; MV), LED-associated drivers
7. Light Diffusing Panel(s) or colored lenses (plastic, glass, metal, composite, synthetic, etc.) with orifices or fixtures for airflow
8. Air circulation fan(s) for lighting and airflow module(s)
200 Growing Module (with light and airflow unit)
10. Air circulation fans for growing area/volume
11. Automatic/Controlled Louvre(s) (e.g., air ducting)
210 Growing module container/box/skin
13. Drawer/Shelving hardware to open and close and support growing plane/flood tray w/products.
14. Drawer/Shelving hardware to open, close, and support growing module.
15. Handles to access growing module
16. Handles to access contents of module
17. Handles to extract products
18. Environmental/A/C manifold to growing area
19. Irrigation/nutrient manifold to growing area
20. HVAC Ducting
21. Air ducting for A/C in
22. Air ducting for A/C return
23. Quick connect to irrigation in
24. Quick connect to irrigation out/subsequent level
25. Electrical plug to fans/light/sensors/electrical
26. User Access Panel
27. Cooling unit(s) (e.g. A/C)—ductless, split ductless, etc
28. Waste heat fan for introduction into system for heating
29. Exhaust system from equipment area (ballasts) (e.g., exhaust fan from electrical area×2)
30. $CO_2$ injection system (e.g., $CO_2$ cylinder, regulator/actuator, comms, sensor)
31. Air compressor(s)
32. UV Sterilizing module(s) (e.g., sterilized unit that uses technologies such as UV, Ozone, chemicals, etc.)
33. Injector Board(s) (e.g., injector(s), particulate filter(s), pressure gauge(s), inline sensor(s)—EC, pH—misc. fittings)
34. Mixing tank(s)
35. Stock Nutrient tank(s)
36. Particulate filter(s)
37. Inline sensor arrays (e.g., pH, EC, DO, T, TDS)
38. Solenoids (e.g., fresh water, nutrient solution)

39. Chiller(s) (e.g., inline, coil, flow thru)
40. Heat Pump (e.g., coil, inline, drop in, flow thru)
41. Fresh H2O riser
42. Ballast(s) (e.g., fluorescent, HID, Or, power sources for LED)
43. Interior cover/door (like a virus screen or pre entry—if box opened, contents still not exposed)
44. Slide in chassis for support modules and equipment
45. Support beams for anchoring
46. Chemical resistant lining (e.g., Rhino Liner)
47. Interior shell (insulation)
48. Insulating paint
49. Exterior shell
50. Exterior Access Panel(s) or door
51. Viewing window (glass, 2 way mirror, composite, plastic)
52. Weather Station
53. GPS Tracking and Communications components
54. Controller/Computer control system (e.g., multiplexer, etc.)
55. Photovoltaic System (e.g., wind turbine)
56. Semi-automatic Crop Production System
57. Visual detection system (camera, track, lenses (e.g., IR, UV, etc.)

Referring now to FIG. 1-6, the present invention features a self-contained semi-automated production system 100 for culturing plants and other organisms in a controlled environment. The system 100 may be used in a variety of environments including but not limited to farms, yards, fields, warehouses or buildings, and the like. The system 100 can be easily transported from one location to another (e.g., because of the size of the system 100 and exterior shell 49). A user can engage in activities such as seeding and harvesting, and the system 100 of the present invention performs the necessary tasks for cultivating the plants or organisms. For example, the system 100 can control conditions including but not limited to light, temperature, relative humidity, carbon dioxide concentration, irrigation, and the like, via internal algorithms and programs. Without wishing to limit the present invention to any theory or mechanism, it is believed that the system 100 of the present invention is advantageous because little agricultural knowledge and experience is required of a user to grow plants and organisms with this system 100. Also, since the system 100 is contained, production of plants, crops, and other organisms can occur continuously, independent of the external climate and conditions.

Figure 1:
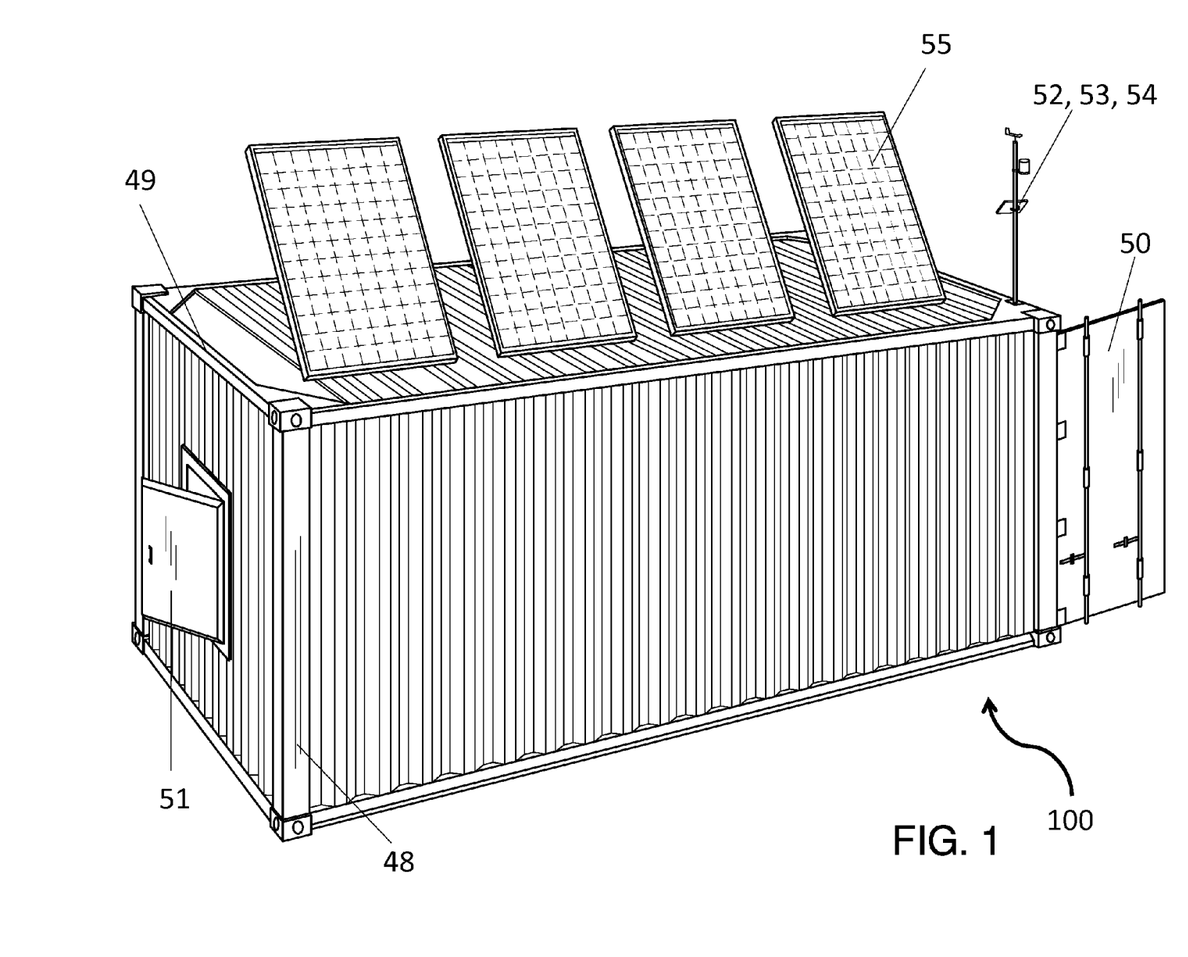
FIG. 1 is a perspective view of the system (100) of the present invention.

The system 100 of the present invention comprises an outer shell 49. In some embodiments, the exterior shell 49 is similar to a shipping container, which is well known to one of ordinary skill in the art, however the exterior shell 49 is not limited to a shipping container. The exterior shell 49 may be constructed in a variety of sizes, for example sizes appropriate for small and large-scale use. An interior shell is disposed (e.g., slidably disposed) in the exterior shell 49. The system 100 may comprise one or more power sources. The power source, for example, may comprise an alternative energy-generating component to create an off-grid or grid-tied system such as one or more photovoltaic panels 55. One or more access points (e.g., doors 50) are disposed in the exterior shell 49. The shell 49 may further comprise a variety of other components, for example for providing strength and/or insulation (e.g., for helping to control the internal environmental conditions accurately). Insulating paint 48 may be coated on the exterior shell 49. In some embodiments, the system 100 further comprises a weather station 52, a GPS tracking and communications component 53, and/or a computer control system 54.

The system comprises user access points and alternative energy-generating components (e.g., Photovoltaic panels) The system may also feature communication components, which allow for communication of information to and from the device. The weather station communicates external environmental information to and from the device for control.

The system 100 may comprise an interior shell 47, which may slide into the exterior shell. The interior shell 47 may provide additional insulation for the system 100 (e.g., resistance to entry/exit or heating or cooling), a chemical resistant barrier, and beams for securing internal structural components (e.g., providing additional strength to the system 100), equipment, wiring, other devices, and the like. A chemical-resistant liner 46 may be disposed in the interior shell 47, allowing the unit to be effectively cleaned and sterilized in preparation for use or modification of the system without damaging the exterior shell 49. Various attachment or fitting components 44 may be disposed on the outside of the interior shell 47, allowing the interior shell 47 to be slid or mounted into the exterior shell 49.

The interior shell 47 provides a means of mounting growing modules and other materials needed for the system 100. For example, mounting components 45 may be disposed on the inner walls of the interior shell 47 for mounting growing modules, irrigation components, light components, and the like.

The present invention is not limited to a configuration with an exterior shell and an interior shell. For example, in some embodiments, the system 100 comprises a single shell, and in some embodiments, the system 100 comprises a plurality of shells.

Figure 2:
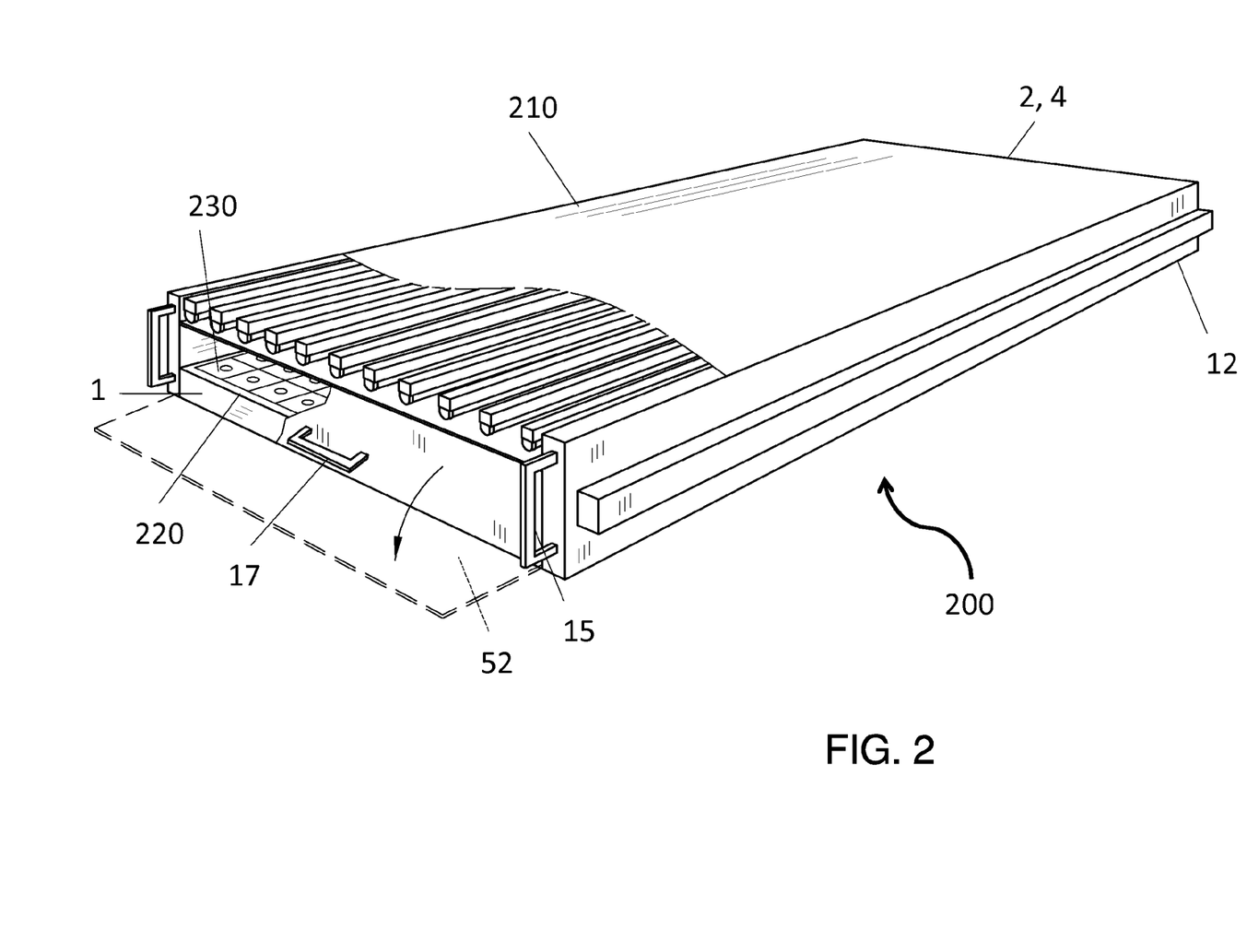
FIG. 2 is a first perspective view of a growing module.

The system 100 of the present invention comprises a plurality of growing modules, which are small isolated containment units. The system 100 creates micro-climates (e.g., with specific environmental parameters) inside the various growing modules installed in the system 100, and each growing module can be used to grow a specific plant or organism (or certain groups of plants or organisms), allowing the specific grown requirements of those plants or organisms to be met. The artificial micro-climates created allows for growth of these plants and organisms in non-traditional environments such as buildings and other urban settings. The growing modules allow for efficient control of parameters such as temperature, light, humidity, carbon dioxide concentration, and the like, because the growing modules have a small volume of space. The environmental parameters are also monitored via sensors 4 for feedback control.

Figure 3A:
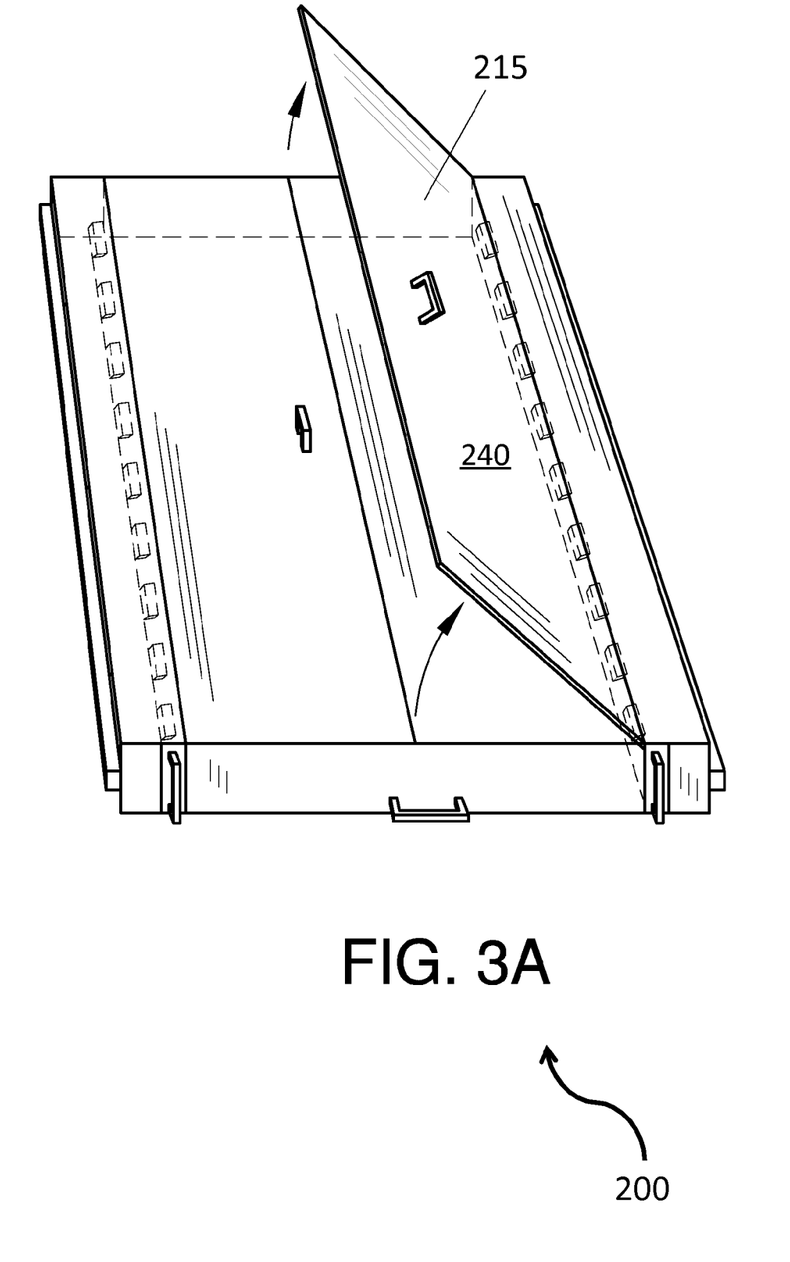
FIG. 3A and FIG. 3B are perspective views of the growing modules (200) with alternate access doors/openings to the module. For example, the opening access (240) is shown in the top surface (215) and alternatively in the side surface (216).
Figure 3B:
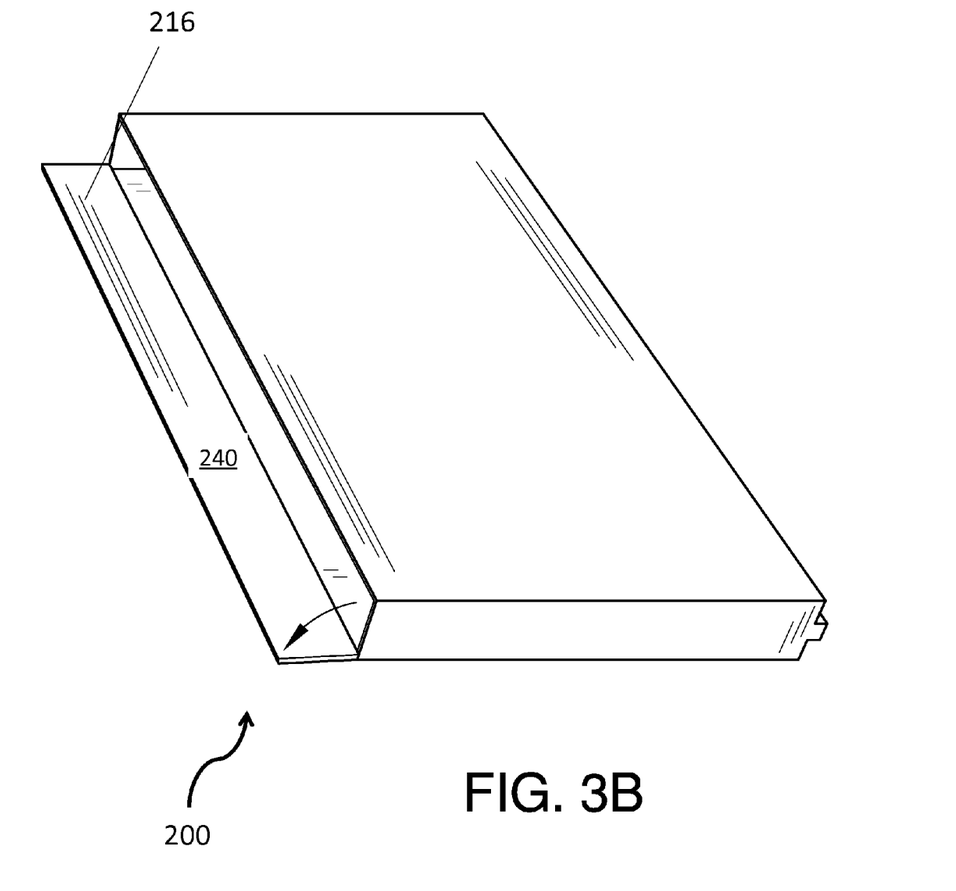
Figure 4:
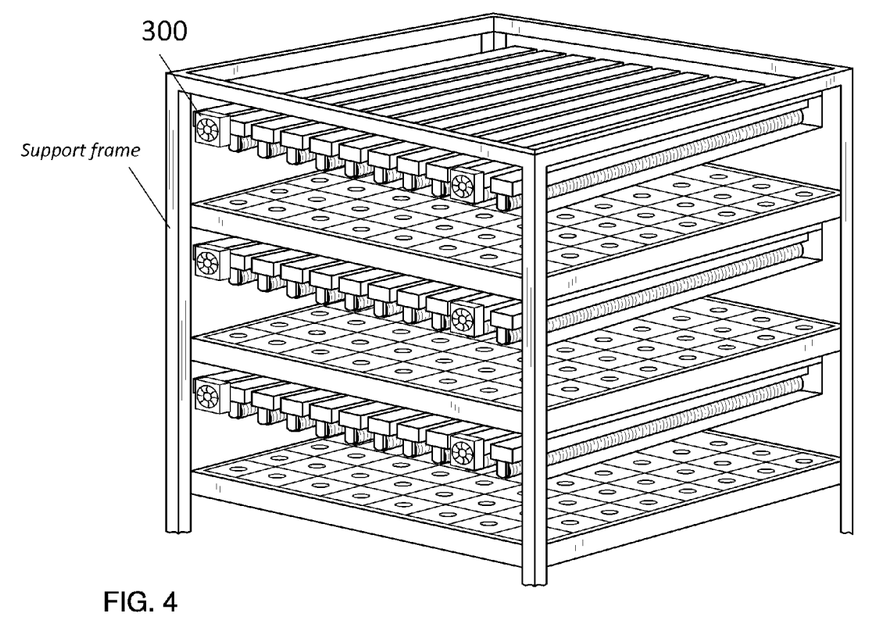
FIG. 4 is a perspective view of a set of growing modules in a support frame.

The growing module may comprise a growing module container and a grid disposed inside the growing module container. The grid comprises a plurality of cells each adapted to hold a plant. In some embodiments, the grid is accessible via an opening access disposed in the growing module container. In some embodiments, the opening access is positioned in a top surface of the growing module container. In some embodiments, the opening access is positioned in a side surface of the growing module container.

In some embodiments, the growing module may comprise a lighting component and a cultivation component, and the housing that surrounds it, which holds the fans and part of the sliding mechanism. The removable and stackable modules are independently controlled and maintained in the system.

The system 100 may also be designed to provide the user information about the plant or organism as it progresses, either for educational purposes or to help the user to make decisions, e.g., to modify conditions or to harvest, etc.

The ability to instantaneously adjust environmental settings based on what is occurring inside the growing area and regulates the immediate conditions of the aerial cultivation environment surrounding the organism, e.g., using components 10, 27, and 30, allows for almost complete control of its culture and manipulation, modification, and/or response. Through the use of external weather stations (e.g., components 52 and 53), the system 100 may opt to utilize external conditions for heating and cooling the device, as well as using data for acclimatizing plants to external conditions where and when appropriate. Usage of passive cooling and heating will increase the efficiency of the device and lower its power requirements.

Figure 5:
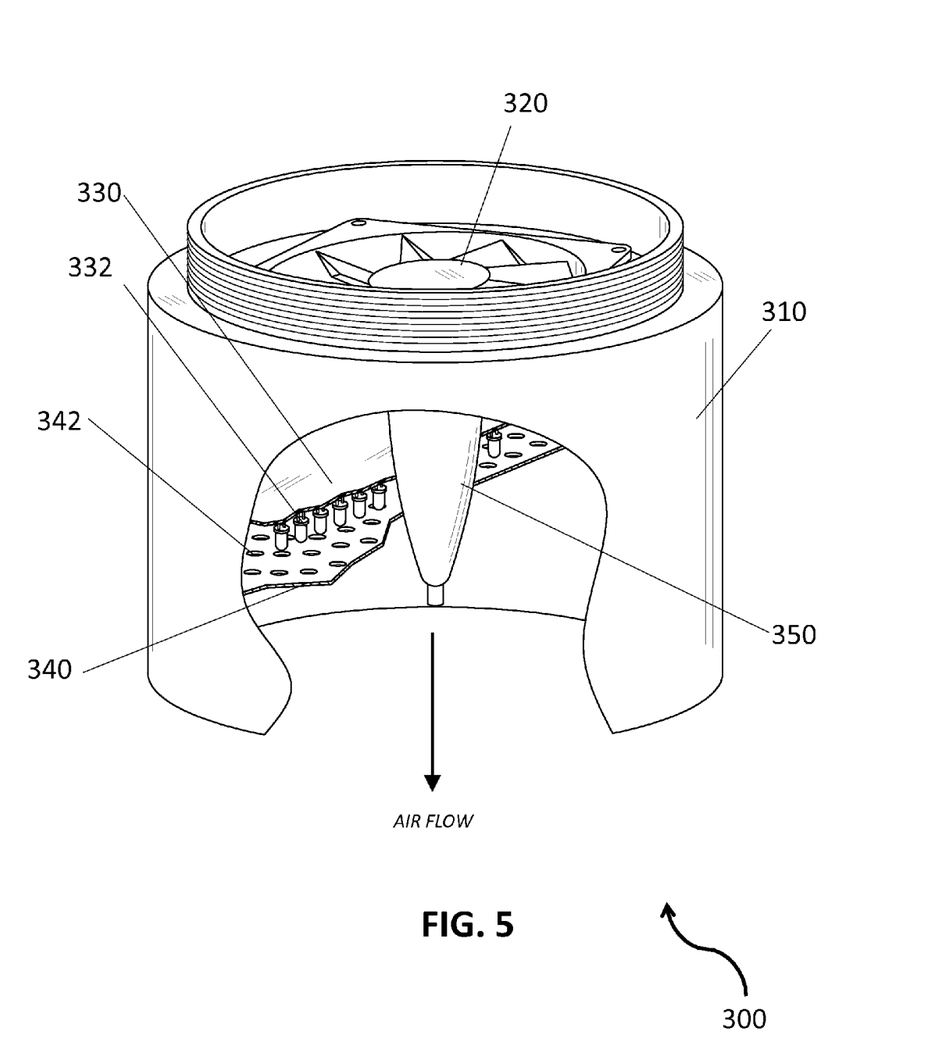
FIG. 5 is an exploded perspective view of a lighting and airflow fixture (300) of the light and airflow unit of the growing module. This lighting and airflow fixture (300) can be used as the lighting unit within the growing module by itself or in combination with other lighting units. The lighting and airflow fixture (300) comprises the housing (310), the fan (320), the light emitting diode (LED) assembly board (330) with LEDs (332), the light diffuser (340) with the air flow orifices (342) and the adjustable air flow nozzle (350).
Figure 6:
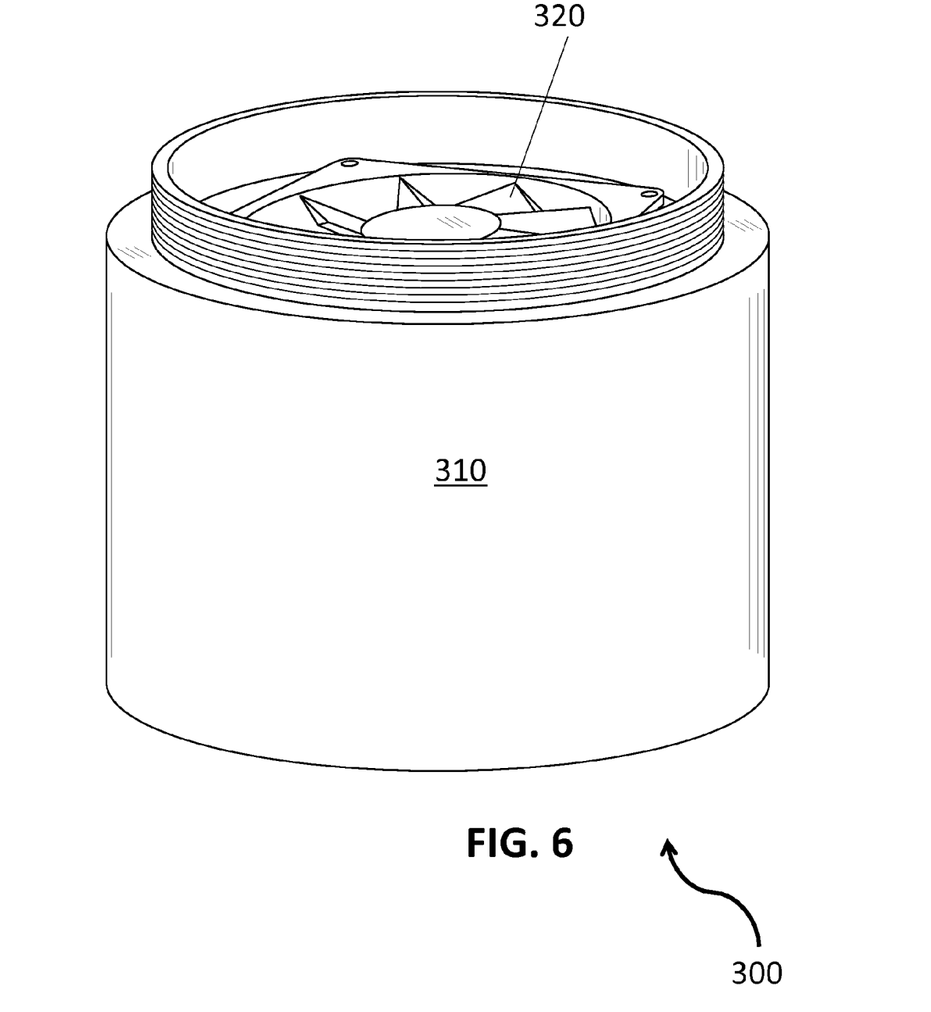
FIG. 6 is another exploded perspective view of a lighting and airflow fixture (300) of the light and airflow unit of the growing module.

Using lighting sources in the growing module (e.g., component 200) such as, but not limited to solar collectors, LEDs, and fluorescent lights (e.g., components 6, 7, 8, 42), the culture and manipulation of plants and other organisms is made possible without use of sunlight. And, such light sources allow the system 100 to manipulate the light conditions as desired (e.g., alternative light cycles, etc.). Light diffusing panels [7] may be used to achieve uniform lighting throughout the growing module, while able to provide cooling and additional airflow (possibly directed) to the aerial portion of the growing environment. Additional heat generated by the light source may be separated by the diffusing panel and then ventilated away from the growing environment (e.g., via component 8). Removing excess heat reduces the load on the air conditioning units, creating a more efficient system.

Controlling the light output reaching the organism allows precise and accurate control of the plant's/organism's development through exposure to specific wavelengths of light emitted including but not limited to UV, PAR, and IR spectrum. Since the amount of light needed varies per plant/organism, the system 100 of the present invention integrates algorithms contained within the computer control systems 54. These algorithms and programs communicate with sensors 4 inside the growing modules to control light intensity, duration, color, quality, and other factors to yield the desired type of growth. This combination of automatic environmental control and sensing allows users to operate the device without prior knowledge of the plant's/organism's optimal conditions.

Computer control systems 54 coupled with sensors 4 (e.g., see components 30, 33, 37, 52, 53, 55, 57, etc.) monitor real-time parameters including but not limited to: air temperature (AT), solution temperature, RH (%), PAR (umol m-2 s-1), $CO_2$, dissolved oxygen, and other parameters, in addition to visual monitoring through camera and other imaging techniques. Communications between sensors and the computer control systems 54 allow for automated control of the conditions required for growth of the selected organism based on pre-programmed set points so the user requires no prior experience or knowledge. Alternatively, a user may enter alternate parameters or set points. Integrating visual monitoring allows for pre-programmed decision software to completely control plant growth and reduces the user's interaction. The computer and other control systems allow remote monitoring, access, and control to be accomplished through terminals, computers, laptops, PDA's, and other communication devices. Remote access allows user interaction and troubleshooting to occur in a non-contact manner, helping to eliminate disturbing of the production process.

The system 100 of the present invention integrates hydroponic methods on a controlled recirculating system and allows for high-efficiency usage of inputs such as water and fertilizer. Some examples of hydroponic methods (e.g., "deep-flow hydroponics") have demonstrated reductions in water usage, for example by over about 50 fold. Recirculating methods increase the efficiency of water use by re-using treated water and preventing it from running out of the system and into the ground. Using an internal irrigation system (e.g., see components 19, 23, 31, 33-40), water may be re-circulated continuously throughout the system. By treating with sterilizing lamps or anti-microbial lights and/or ozone-generating systems (e.g., see component 32), nutrient solution and water may be recirculated without introduction of pests, pathogens, and other organisms that may develop or be introduced otherwise. Other treatments (e.g., chemical additives) may be used with the system 100 of the present invention. The recirculation of nutrient solution and its sterilization using the system 100 may provide for optimal water usages and higher efficiency of usage for fertilizer as well.

The lighting and airflow fixture comprises a housing (e.g., a cylindrical housing) and a fan disposed in the housing and positioned to blow air downwardly (e.g., vertically). The lighting and airflow fixture as shown positioned the fan at the top portion of the housing and the bottom portion of the housing is open to allow air flow to exit the housing. A light emitting diode (LED) assembly board comprising LEDs is disposed below the fan in the housing, and a light diffuser is disposed below the LED assembly board. In some embodiments, the light diffuser comprises air flow orifices. An adjustable air flow nozzle extends downwardly from the fan and protrudes through the LED assembly board and the light diffuser. The adjustable air flow nozzle provides directed air flow downwardly (e.g., to the bottom portion of the housing). A plant (e.g., in a cell in a grid of a growing module) is positioned below the air flow. The LEDs provide light, and the light diffuser shapes and directs the light to the plant.

The lighting and airflow fixture may be a part of a growing module. As previously described, the growing module may comprise a growing module container and a grid disposed inside the growing module container. The grid comprises a plurality of cells each adapted to hold a plant. A light and airflow unit is positioned above the grid. A plurality of lighting and airflow fixtures are disposed in the light and airflow unit such that each lighting and airflow fixture is positioned above a cell and air flow from the fan and light from the LEDs of the lighting and airflow fixture is directed downwardly to its respective cell.

In some embodiments, the light and airflow unit disposed inside the growing module container above the grid comprises a light and a plurality of light diffusers positioned below the light such that each light diffuser is positioned above a cell. The light diffusers are adapted to shape light passed to the cells. In some embodiments, a fan is disposed above the light diffusers. Each light diffuser directs air flow downwardly to its respective cell.

The present invention features a semi-automated crop production system. In some embodiments, the system comprises a growing module comprising a growing module container, a grid disposed inside the growing module container, the grid comprises a plurality of cells adapted to hold a plant, and a light and airflow unit disposed inside the growing module container positioned above the grid; and a plurality of lighting and airflow fixtures each comprising a housing; a fan disposed in the housing and positioned to blow air downwardly; a light emitting diode (LED) assembly board comprising LEDs disposed below the fan in the housing; a light diffuser disposed below the LED assembly board, the light diffuser comprises air flow orifices; and an adjustable air flow nozzle extending downwardly from the fan and protruding through the LED assembly board and the light diffuser, the adjustable air flow nozzle provides directed air flow downwardly toward a bottom area of the housing, wherein the plurality of lighting and airflow fixtures are disposed in the light and airflow unit such that each lighting and airflow fixture is positioned above a cell and air flow from the fan and light from the LEDs of the lighting and airflow fixture is directed downwardly to its respective cell; wherein the growing module and the lighting and airflow fixture are together slidably inserted into a shell.

The following the disclosures of the following U.S. Patents are incorporated in their entirety by reference herein: U.S. Pat. No. 2008/0295400.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the invention.

EXAMPLES

The examples provided below are merely examples to further clarify the present invention, and do not limit the scope of the invention in any way.

Example 1

Transplant Growing Protocol

Transplant Growing Protocol:
1. Seed
2. Germinate
3. Preparation
4. Transplant
5. Monitor
6. Harvest
7. Adjust
1. Obtain clean materials needed for germination: Seed, substrate, tray & cover.
   a. Use 98/200 cell Rockwool slabs and place inside black plastic germination tray.
      i. (Optional) Rinse Rockwool substrate with water for 1 minute.
      ii. Use Jiffy preformed media and place in tray
   b. Obtain the seed from the Seed Refrigerator.
2. Pour out the seed desired, and then seal the package and place back inside the refrigerator.
   a. Be sure to place the seeds back into the refrigerator.
      i. Thermal dormancy—High temperatures, above 18 C (optimal germination T) may have an adverse effect on lettuce seed germination. This can be reversed, however the cost and time to do so may be prohibitive. Instead, good seed management practices can prevent thermodormancy.
3. Place seed in substrate.
   a. Pelleted—Place 1 seed per cell in pre-stamped hole
   b. Naked—place 2-3 seeds in pre-stamped hole.
   c. (Optional) Smear one handful of vermiculite over the slab filling each hole lightly. Use more if necessary.
4. Place seeded trays in propagation area
   a. If un-irrigated, place clear cover over tray.
   b. If irrigated, check irrigation settings and function
5. Check each day for germination and record %'s.
   a. Ensure that the slab stay wet, but not soaking.
   b. Ensure no fungal growth or other
6. Begin irrigating with full strength nutrient solution 3 days after germination of at least 90% of the seeds.
7. 12 days after sowing, select plants that are uniform in size, shape, and leaf number as best as possible.
8. Check DFHS system settings to ensure set points are correct for crop.
   a. EC~2.0 mS/m; pH 5.90-6.10; DO~6.9 ppm; $H_2O$ Temp~21.0 C
9. Check tanks daily for EC/pH/DO and monitor accordingly.
10. Harvest plants
    a. Remove dead leaves or unsightly parts of the product
    b. Store in humid, cool area out of direct sunlight
11. - - -
12. Weigh
    a. A—Market acceptable; 150 g+
    b. B—Not market acceptable, but still usable; 75 g-150 g
    c. C—Not usable, feed, compost or trash; <75 g
13. Grade
    a. A—Market acceptable
    b. B—Not market acceptable, but still usable
    c. C—Not usable, feed, compost or trash
14. Sort
15. (Optional) Sterilize
16. Pack/Label
17. Storage

|  | Germ | Cult | Storage | Acclimatization |
| --- | --- | --- | --- | --- |
| EC | Amb-<0.5 | 1.5 | 0 | Ambient |
| pH | 5.5-6.5 | 6 | 0 | Ambient |
| Air T | 29 C. | 20-30 | 0-10 | Ambient |
| Water T | 20-30 C. | 20-30 | 0 | Ambient |
| RH | 50-99% | 10-99% | 10-99% | Ambient |
| VPD |  |  |  | Ambient |
| PAR | 0-250 | 250-1000 | 0-250 | Ambient |
| CO2 | 300-1000 ppm | 300-2000 | 0-500 | Ambient |
| Air Speed | 0-.5 m/s | 0-5 m/s | 0-5 | Ambient |

What is claimed is:

1. A lighting and airflow fixture (300) comprising:
   (a) a housing (310);
   (b) a fan (320) disposed in the housing (310) and positioned to blow air downwardly;
   (c) a light emitting diode (LED) assembly (330) comprising LEDs (332) disposed below the fan (320) in the housing (310);
   (d) a light diffuser (340) disposed below the LED assembly board (330), the light diffuser (3401 comprises air flow orifices (342); and
   (e) an adjustable air flow nozzle (350) extending downwardly from the fan (320) and protruding through the LED assembly board (330) and the light diffuser (340), the adjustable air flow nozzle (350) provides directed air flow downwardly toward a bottom area of the housing (310).

2. The lighting and airflow fixture (300) of claim 1, wherein the housing (310) is cylindrical.

3. A semi-automated crop production system (100), the system (100) comprising:
   (a) a growing module (200) comprising a growing module container (210), a grid (220) disposed inside the growing module container (210), the grid (220) comprises a plurality of cells (230) adapted to hold a plant; and (b) a plurality of lighting and airflow fixtures (300) disposed inside the growing module container (210) and positioned above the grid (220), each lighting and airflow fixture (300) comprises each comprising a housing (310); a fan (320) disposed in the housing (310) and positioned to blow air downwardly; a light emitting diode (LED) assembly board (330) comprising LEDs (332) disposed below the fan (320) in the housing (310); a light diffuser (340) disposed below the LED assembly board (330), the light diffuser (340) comprises air flow orifices (342); and an adjustable air flow nozzle (350) extending downwardly from the fan (320) and protruding through the LED assembly board (330) and the light diffuser (340), the adjustable air flow nozzle (350) provides directed air flow downwardly toward a bottom area of the housing (310), wherein the plurality of lighting and airflow fixtures (300) are arranged such that each lighting and airflow fixture (300) is positioned above a cell (230) and air flow from the fan (320) and light from the LEDs (332) of the lighting and airflow fixture (300) is directed downwardly to its respective cell (230); wherein the growing module (200) and the lighting and airflow fixture (300) are together slidably inserted into a shell (49).

4. The lighting and airflow fixture of claim 3, wherein the housing (310) is cylindrical.

5. The lighting and airflow fixture of claim 3, wherein the grid (220) is accessible via an opening access (240) disposed in the growing module container (210).

6. The growing module of claim 5, wherein the opening access (240) is positioned in a top surface (215) of the growing module container (210).

7. The growing module of claim 5, wherein the opening access (240) is positioned in a side surface (216) of the growing module container (210).

8. The system of claim 3 further comprising an energy generating component.

9. The system of claim 8, wherein the energy generating component is a photovoltaic panel (55).

* * * * *